US006922016B2

United States Patent
Yoo et al.

(10) Patent No.: US 6,922,016 B2
(45) Date of Patent: Jul. 26, 2005

(54) LAMP ASSEMBLY FOR LIQUID CRYSTAL DISPLAY DEVICE

(75) Inventors: Hyeong-Suk Yoo, Seongnam-si (KR); Sung-Chul Kang, Seongnam-si (KR); Ju-Young Yoon, Woolsangwangyok-si (KR); Weon-Sik Oh, Osan-si (KR); In-Sun Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 319 days.

(21) Appl. No.: 10/080,324

(22) Filed: Feb. 21, 2002

(65) Prior Publication Data

US 2002/0114171 A1 Aug. 22, 2002

(30) Foreign Application Priority Data

Feb. 21, 2001 (KR) .......................................... 2001-8762
Nov. 22, 2001 (KR) ........................................ 2001-72839

(51) Int. Cl.$^7$ .............................. H01J 11/00; H01J 65/00
(52) U.S. Cl. ............. 313/607; 313/318.01; 313/318.03; 313/318.12; 313/631; 313/635; 313/244; 313/234; 313/594
(58) Field of Search ................................. 313/607, 631, 313/635, 244, 318.12, 356, 618, 318.01, 318.02, 318.03, 318.05, 318.07, 318.09, 594, 234; 362/256, 217, 255, 260, 263, 67; 439/244, 519

(56) References Cited

U.S. PATENT DOCUMENTS

| 2,624,858 | A | * | 1/1953 | Greenlee .................... 313/607 |
| 3,156,841 | A | * | 11/1964 | Ayres .......................... 313/49 |
| 5,311,097 | A | * | 5/1994 | Mepham et al. .............. 313/51 |
| 5,514,934 | A | * | 5/1996 | Matsumoto et al. ........ 313/607 |
| 5,973,449 | A |   | 10/1999 | Nakamura et al. |

* cited by examiner

*Primary Examiner*—Joseph Williams
*Assistant Examiner*—Sharlene Leurig
(74) *Attorney, Agent, or Firm*—Cantor Colburn LLP

(57) ABSTRACT

A lamp assembly for a liquid crystal display device includes a lamp tube for generating light, and electrodes each having a suitable shape for receiving end portions of the lamp tube. The lamp tube and the electrodes are combined to generate the light by applying electric power to the electrodes. The lamp assembly may include multiple lamp tubes having different brightness from each other, in which the brightness difference between the lamp tubes is compensated by uniformly diffusing the light generated from the lamp tubes.

15 Claims, 17 Drawing Sheets

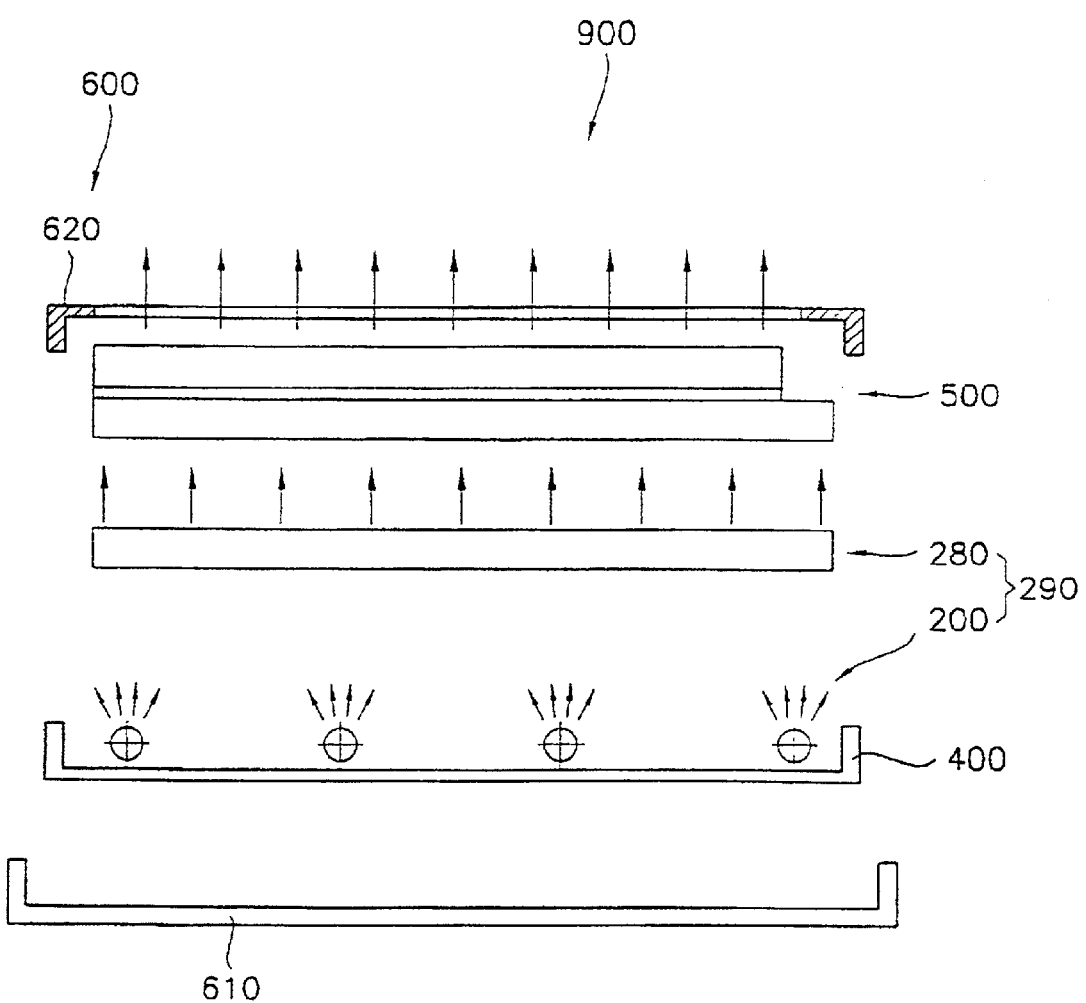

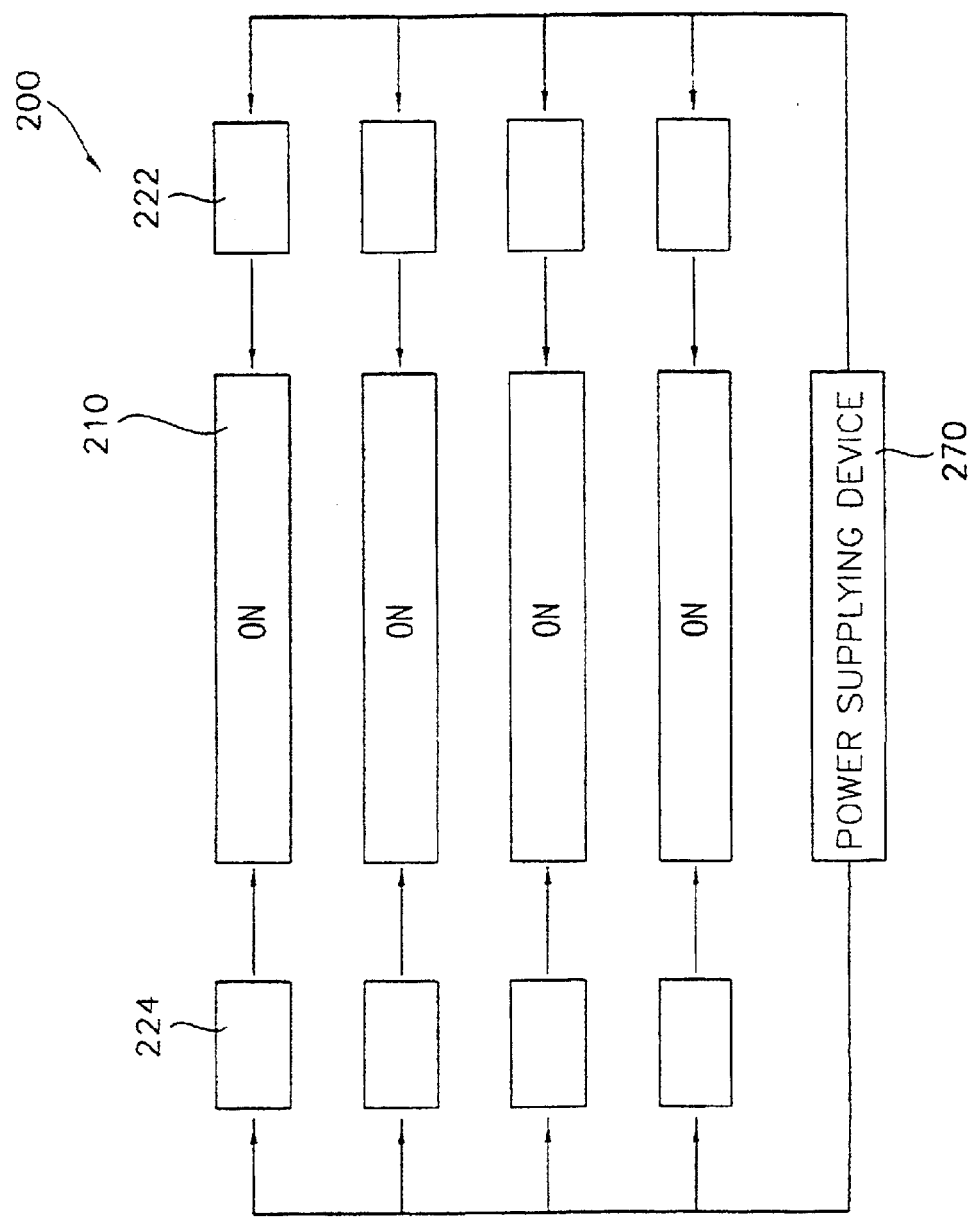

LAMP ASSEMBLY FOR LIQUID CRYSTAL DISPLAY DEVICE

BACKGROUND OF THE INVENTION

1. Field of the Invention

The present invention relates to a liquid crystal display device, and more particularly to a lamp assembly for a liquid crystal display device and a method of assembling the same.

2. Description of the Related Art

Generally, a liquid crystal display device (LCD) may be defined as a flat display device for displaying characters, images and/or moving pictures by precisely controlling liquid crystal in accordance with data processed at an information process device. A typical liquid crystal display device includes liquid crystal, a device for generating electric field, and a light supplying device.

The liquid crystal sensitively responds to changes in the intensity of the electric field, the device for generating electric field has a structure to precisely control the liquid crystal, and the light supplying device provides light which passes through the controlled liquid crystal.

The liquid crystal, the device for generating electric field, and the light supplying device are important components for a liquid crystal display device. The liquid crystal display device cannot properly operate when any of those devices does not accurately operate. For instance, the liquid crystal display device cannot properly operate when the light supplying device improperly operate although the liquid crystal and the device for generating the electric field properly operate.

The light supplying device includes a lamp for generating light, and a group of optical sheets for uniformly adjusting brightness of the light generated from the lamp. The light supplying device is called a lamp assembly.

It is desirable that a lamp emits white light such as the solar light and has planar light source optical distribution. Such a lamp, however, can be hardly manufactured so that lamps having linear light source optical distribution are widely used.

FIG. 1 is a schematic cross-sectional view illustrating a conventional lamp 10 having linear light source optical distribution.

Referring to FIG. 1, the lamp 10 has a transparent lamp tube 1, fluorescent material (not shown) coated on the inside wall of the lamp tube 1, discharging gas 2 injected into the lamp tube 1, and two electrodes 3 and 4 disposed on both end portions of the lamp tube 1.

A discharging voltage is externally applied to both electrodes 3 and 4 of the lamp 10. As a result, electrons 5 move from one of the electrodes 3 and 4 to the other of the electrodes 3 and 4 according to an electric potential difference between the electrodes 3 and 4. The electrons 5 collide with the discharging gas 2 while the electrons 5 move from one electrode to the other electrode. Hence, the discharging gas 2 is dissociated into discharging gas atoms, electrons and neutrons to form plasma. Light 6 having a predetermined wave length is generated during the dissociation of the discharging gas, and then excites the fluorescent material to generate visible light 7 from the fluorescent material. The supply of the discharging voltage to the lamp 10 is carried out using an inverter (not shown) and a transformer (not shown).

Recently, there has been a rapid development in the technology for a liquid crystal display device having a large display size, which is generally larger than that of a liquid crystal display device employing one lamp such as shown in FIG. 1. When the size of a display device is so large that one lamp cannot sufficiently illuminate a display region of the display device, the length of the lamp should be increased.

However, when the length of the lamp 10 is increased, the discharging voltage should be increased since the distance between the electrodes 3 and 4 is increased. In this case, a transformer should boost the voltage to increase the discharging voltage. As a result, power consumption of the display device is greatly increased.

To solve the power consumption problem, a multi-lamp type light source including multiple lamps connected to an inverter has been developed.

FIG. 2 is a schematic diagram showing a conventional multi-lamp type light source in which lamps are connected to one inverter, and FIG. 3 is a schematic diagram for illustrating brightness degradation of an image displayed by a display device including the lamps and the inverter in FIG. 2.

Power consumption of a display device employing the multi-lamp type light source does not increase because the lamps 20, 30 and 40 are connected to the inverter 50 in parallel. However, the multi-lamp type light source may cause brightness non-uniformity in an effective display region 70 where an image is displayed as shown in FIG. 3. The effective display region 70 can be defined as a maximum screen area which displays an image.

In this case, the brightness non-uniformity in the effective display region 70 may be caused by the reasons as follows.

The brightness non-uniformity occurs because the lamps 20, 30 and 40 are linear light source type. Such a problem can be overcome using a brightness correction device such as a light guiding plate.

Also, the brightness non-uniformity occurs due to electric current characteristic differences among the several lamps 20, 30 and 40 of the linear light source type as well as electric power supplied from the inverter 50.

Particularly, in the multi-lamp light source as shown in FIG. 2, plasma density in the lamps 20, 30 and 40 increases as the applied electric current increases when the lamps 20, 30 and 40 each generate light by means of forming plasma therein. The plasma density is increased, when a larger amount of electric current is applied thereto. That is, the lamps 20, 30 and 40 have electrical characteristics similar to a variable resistor whose resistance decreases in accordance with an increase in the electric current.

When the lamps 20, 30 and 40 are connected to one inverter 50 in parallel, the same electric power is applied to the respective lamps 20, 30 and 40. Thus, the lamps 20, 30 and 40 each emit light of the same luminosity if the electrical characteristics of the lamps 20, 30 and 40 are substantially identical.

However, since it is impracticable that all the lamps 20, 30 and 30 have the same electrical characteristics, a lamp having relatively better electrical characteristic is gradually brightened due to an increase of the applied current while a lamp having relatively poor electrical characteristic is gradually darkened due to a decrease of the applied current.

Therefore, the brightness differences among the lamps increase when a plurality of lamps are connected to one inverter providing electric power. Such problem can be overcome by connecting one inverter with one lamp. However, dimension and manufacturing cost of a display device are greatly increased when each lamp is provided with an inverter.

SUMMARY OF THE INVENTION

The present invention solves the aforementioned problems. It is a first object of the present invention to provide a lamp having maximized light efficiency, minimized power consumption and high mass productivity, in which multiple lamps are connected to one inverter in parallel and the brightness difference between the lamps is corrected and minimized.

It is a second object of the present invention to provide a lamp assembly having maximized light efficiency and minimum power consumption by combining a plurality of lamps having electrodes on outer surface portions of lamp tubes with separate sockets.

It is a third object of the present invention to provide a light supplying device generating light having uniform brightness distribution from a plurality of lamps which are operated by one inverter.

It is a fourth object of the present invention to provide a liquid crystal display device having maximized light efficiency, minimized power consumption, minimized brightness difference, and high display quality, where lamps are connected to one inverter in parallel.

It is a fifth object of the present invention to provide a method for assembling a liquid crystal display device having maximized light efficiency, minimum power consumption, minimized brightness difference, and high display quality.

It is a sixth object of the present invention to provide an illuminating method for a liquid crystal display device having maximized light efficiency, minimum power consumption, minimized brightness difference, and high display quality.

To achieve the first object of the present invention, there is provided a lamp for generating light. The lamp has a lamp tube and an electrode. Fluorescent material is coated on an inner surface of the lamb tube. Discharging gas is injected in the lamp tube. In the lamp tube, light is generated by receiving electric power which is externally provided. The electrode is provided for receiving the lamp tube and applying the electric power to the lamp tube.

Also, to achieve the second object of the present invention, there is provided a lamp assembly for a liquid crystal display device which has a lamp and a conductive socket. The lamp has a lamp tube including discharging gas injected into the lamp tube and fluorescent material coated on an inner surface of the lamp tube, for generating light by receiving electric power, and an electrode disposed on a surface portion of the lamp tube. The conductive socket receives the electrode of the lamp and the electric power is externally applied to the conductive socket.

To achieve the third object of the present invention, there is provided a light supplying device for a liquid crystal display device which has lamps, power supply means, and light diffusing means. The lamps each include a lamp tube having a predetermined dielectric constant and electrodes formed on end portions of the lamp tube. The power supply means is connected to the electrodes of the lamp tubes to provide electric power to the electrodes, where the lamp tubes are connected in parallel to each other with respect to the power supply means. The light diffusing means uniformly diffuses the light generated from the lamps.

To achieve the fourth object of the present invention, there is provided a liquid crystal display device which has a receiving container, a lamp, a diffusion plate, and a liquid crystal display panel. The lamp has at least one lamp tube including discharging gas injected in the lamp tube and fluorescent material coated on an inner surface of the lamp tube for generating light by receiving electric power, wherein the lamp tube is disposed within the receiving container, and electrodes for receiving the externally applied electric power and providing the electric power to surface portions of the lamp tube, where the electrodes are formed to receive end portions of the lamp tube. The diffusion plate is disposed on a transmitting path of the light generated from the lamp and the diffusion plate may be received within the receiving container. The liquid crystal display panel modulates the light passing through the diffusion plate to generate image light to display images on a display device.

To achieve the fifth object of the present invention, there is provided a method for assembling a liquid crystal display device. A pair of first conductive members is disposed in a receiving container for a pair of electrodes separated from each other. End portions of a lamp tube are combined with the first conductive members, wherein the lamp tube has fluorescent material coated on an inner surface of the lamp tube and discharging gas injected therein. Then, the receiving container is combined with a liquid crystal display panel displaying an image by receiving light from the lamp tube.

Furthermore, to achieve the sixth object of the present invention, there is provided an illuminating method for a liquid crystal display device. A common driving electric power is applied from a power supply means to lamps each having electrodes formed on end portions of the lamp, wherein the lamps have different electric characteristics. Light having the same optical characteristics is generated from each lamp by correcting electric differences of the lamps in accordance with the electric characteristics of the lamps. The light from the lamps is applied to a light diffusing means, and the light generated from the light diffusing means is applied to a liquid crystal display panel for displaying an image.

According to the present invention, the power consumption of a liquid crystal display device is reduced and its light efficiency increases when light for displaying an image is generated from one lamp. Also, the liquid crystal display device may have, in addition to the reduced power consumption and improved light efficiency, minimized brightness difference between the lamps, in case that the liquid crystal display device includes a plurality of lamps for generating light for displaying images.

BRIEF DESCRIPTION OF THE DRAWINGS

The above and other objects and advantages of the present invention will become readily apparent by reference to the following detailed description when considered in conjunction with the accompanying drawings wherein:

FIG. 7 is a schematic diagram showing a liquid crystal display device including a lamp assembly according to a preferred embodiment of the present invention;

FIG. 10 is a schematic diagram illustrating an arrangement of lamps according to a preferred embodiment of the present invention.

DESCRIPTION OF THE PREFERRED EMBODIMENTS

Hereinafter, preferred embodiments of a lamp assembly for liquid crystal display devices and a method of fabricating a liquid crystal display device including the lamp assembly according to the present invention will be described in detail with reference to the accompanying drawings.

Figure 1:
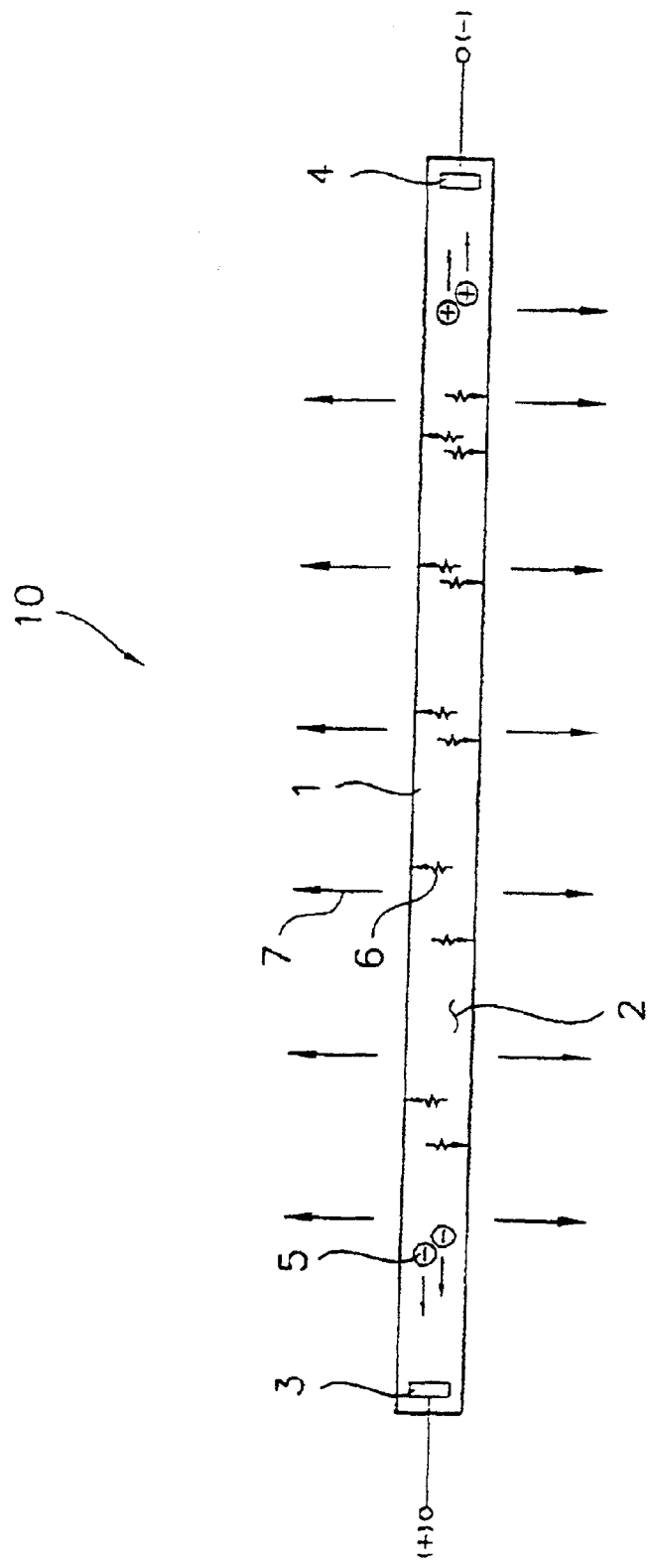
FIG. 1 is a schematic cross-sectional view illustrating a structure and operation of a conventional lamp.
Figure 2:
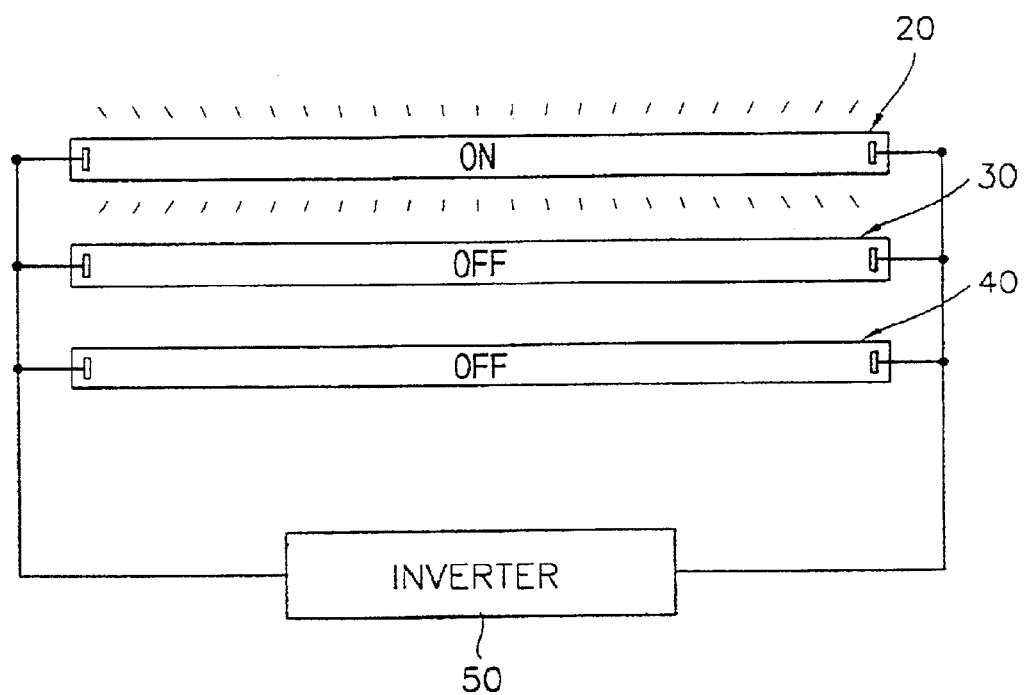
FIG. 2 is a schematic diagram showing conventional lamps connected to one inverter.
Figure 3:
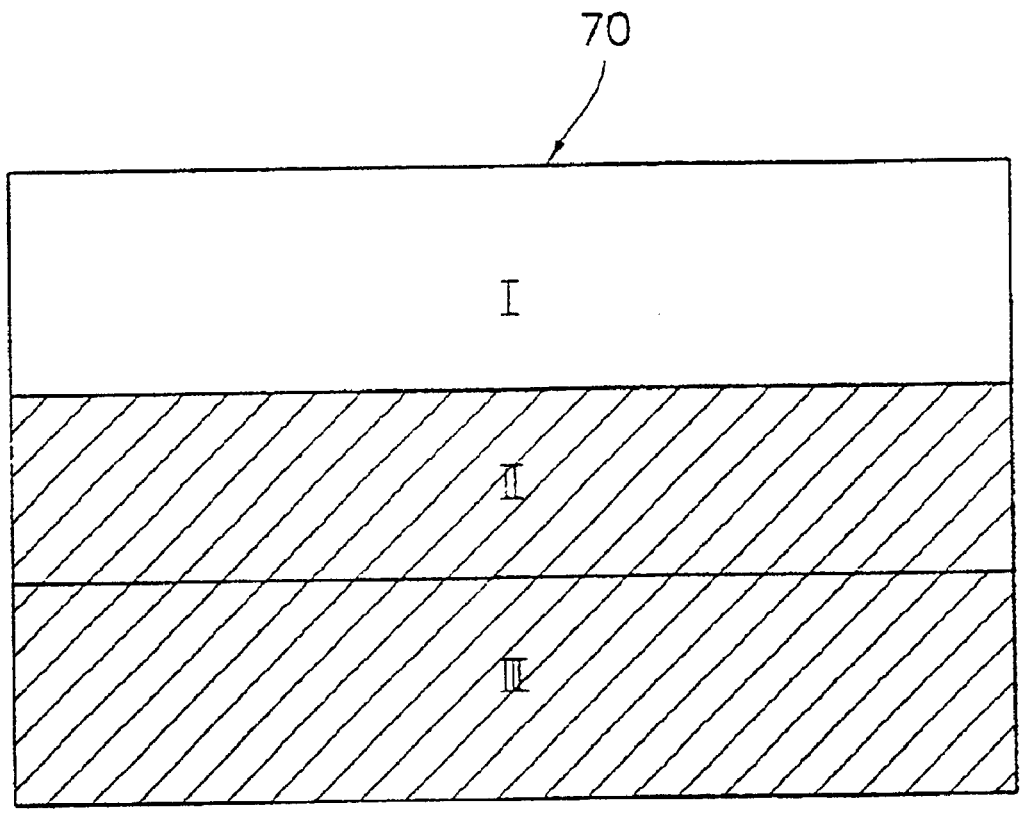
FIG. 3 is a schematic diagram illustrating brightness degradation of an image displayed by a display device including the lamps and the inverter in FIG. 2.
Figure 4A:
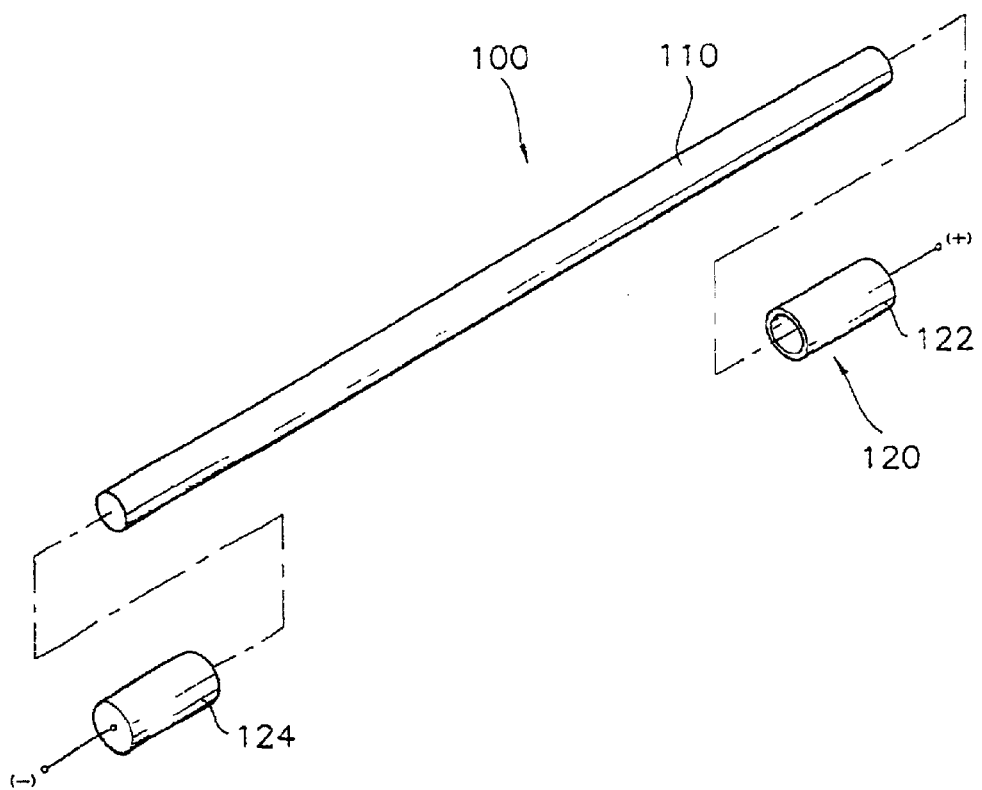
FIG. 4A is an exploded perspective view showing a lamp according to one preferred embodiment of the present invention.
Figure 4B:
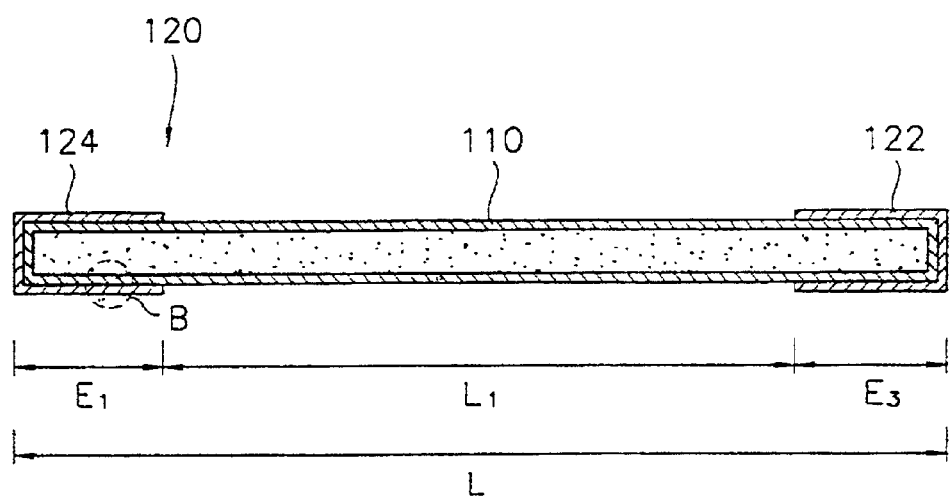
FIG. 4B is a cross-sectional view illustrating the lamp in FIG. 4A.
Figure 4C:
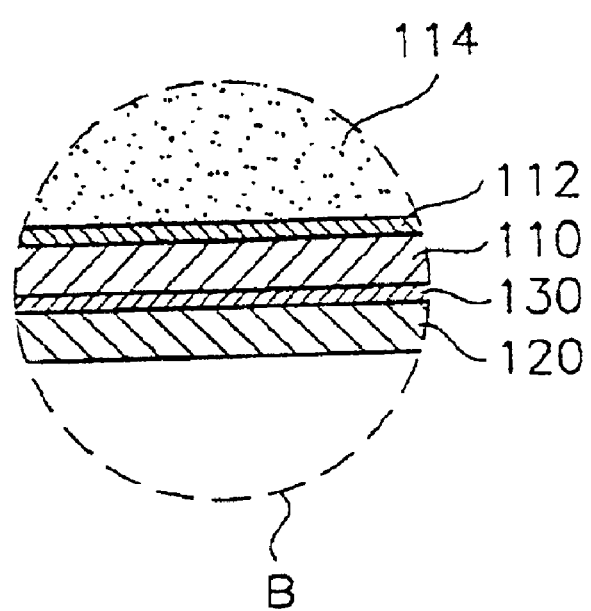
FIG. 4C is an enlarged cross-sectional view of portion 'B' in FIG. 4B.

FIG. 4A is an exploded perspective view showing a lamp according to one preferred embodiment of the present invention, FIG. 4B is a cross-sectional view illustrating the lamp in which a lamp tube is combined with electrodes, and FIG. 4C is an enlarged cross-sectional view of portion 'B' in FIG. 4B.

FIG. 4A shows a lamp 100 in accordance with one embodiment of the present invention. The lamp 100 has a lamp tube 110 for generating light, and electrodes 120 (e.g., two electrodes 122 and 124) disposed on both ends of the lamp tube 110 to supply the lamp tube 110 with electric power. The lamp tube 110 has the ends which are sealed. The lamp tube 110 is made of, for example, glass in this embodiment.

Referring to FIG. 4C, fluorescent material 112 is coated on the inside wall of the lamp tube 110, and discharging gas 114 is injected into the lamp tube 110.

Referring again to FIGS. 4A and 4B, the electrodes 120 for providing the power to the lamp tube 110 are manufactured such that the electrodes 120 may be separated from the lamp tube 110. In this case, the electrodes 120 each have a shape for appropriately receiving the lamp tube 110 so that the ends of the lamp tube are respectively inserted into the electrodes 120.

Thus, the electrodes 120 have a proper shape for making contact with and receiving the lamp tube 110. The electrodes 120 may have various shapes.

The electrodes 120 may have a simple shape, for example, a conductive cylindrical shape of which both ends are opened or one end is sealed for properly receiving two ends of the lamp tube 110 as shown in FIGS. 4A and 4B.

The inner diameter of each electrode 120 having the above-mentioned shape is accurately designed so that the electrodes fit with the lamp tube 110 without a minute interval.

Referring to FIGS. 4B and 4C, a dielectric layer 130 is formed between the outer surface of the lamp tube 110 and the inner surface of the electrodes 120. The dielectric layer 130 may include an adhesive component so that the dielectric layer 130 may attach the lamp tube 110 to the electrodes 120. When alternating discharging electric power for sufficiently discharging electrons is applied to the electrodes 120, the discharging of electrons from the electrodes 120 occurs due to an electric potential difference between the electrodes 120. For example, the alternating discharging electric power is applied from an inverter and transformer to the electrodes 120. In this case, the discharged electrons move across the lamp tube 110 at a high velocity, so the electrons collide with the discharging gas 114 in the lamp tube 110. Thus, the discharging gas 114 is dissociated into discharging gas ions, electrons, and neutrons. As a result, the conductive plasma environment is generated in the lamp tube 110. The plasmatic discharging gas having plus (+) polarity is attracted to the electrode 122 having minus (−) polarity, and the electrons are attracted to the electrode 124 having plus polarity. The polarities of the electrodes 122 and 124 can be changed each other.

Light having a predetermined wavelength generated during formation of the plasma environment excites the fluorescent material 112 to generate visible light from the fluorescent material 112 for displaying an image.

Referring to FIG. 4B, when the length of a whole effective light emitting region of the lamp tube 110 is "L", a real effective light emitting region of the lamp tube 110 generating light for displaying the image has a length obtained by subtracting lengths of two electrodes E1 and E3 from the length of the whole effective light emitting region L. In FIG. 4B. The length of the real effective light emitting region is represented as "L1"

As the length of the real effective light emitting region L1 of the lamp tube 110 is shorter than the length of the whole effective light emitting region L, the light emitted from the lamp tube 110 decreases. Hence, efficiency of the electric energy consumption for generating the light may be decreased.

Figure 5A:
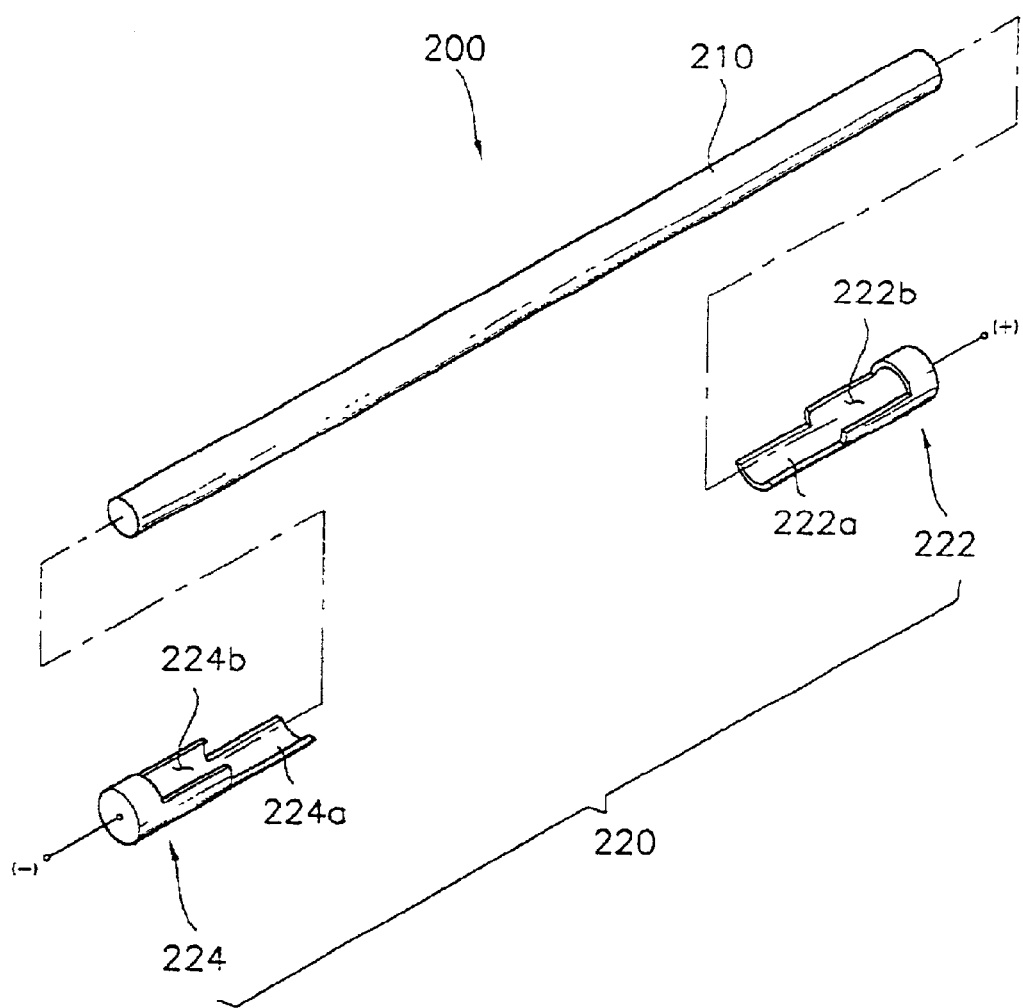
FIG. 5A is an exploded perspective view illustrating a lamp according to another embodiment of the present invention.
Figure 5B:
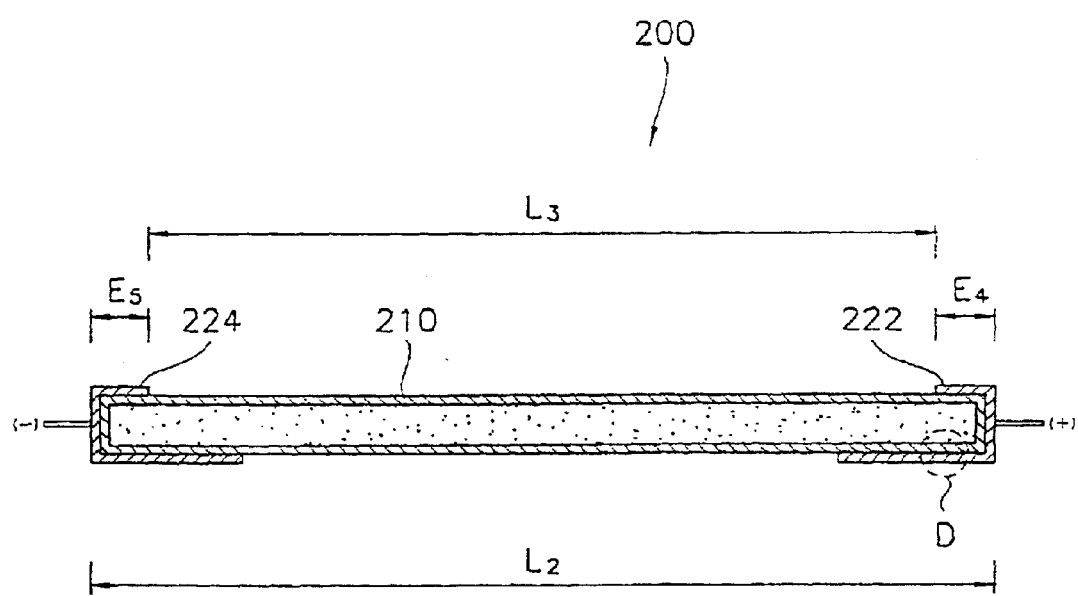
FIG. 5B is a cross-sectional view showing the lamp in FIG. 5A.
Figure 5C:
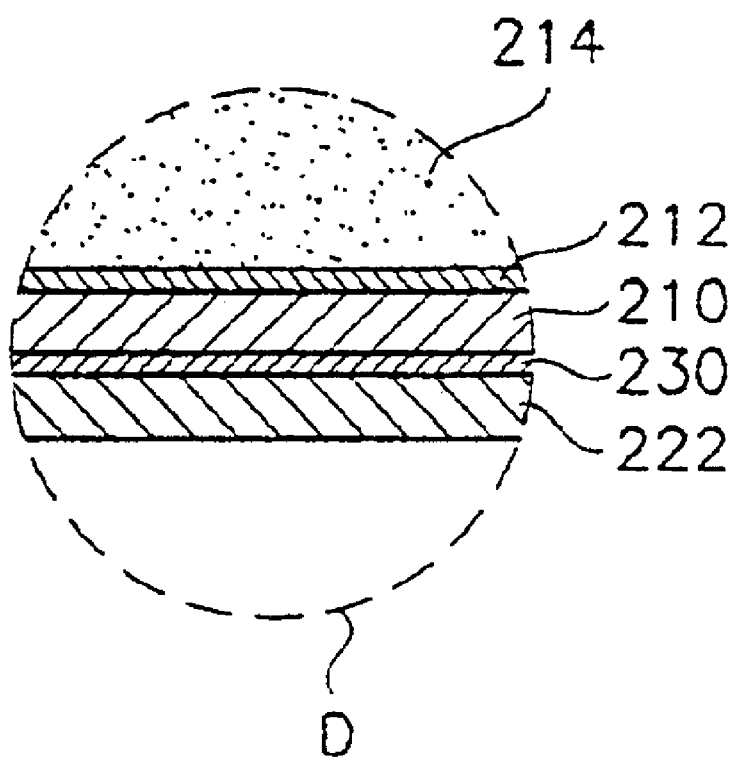
FIG. 5C is an enlarged cross-sectional view of portion 'D' in FIG. 5B.

FIG. 5A is an exploded perspective view illustrating a lamp according to another embodiment of the present invention, FIG. 5B is a cross-sectional view showing the lamp having a lamp tube combined with electrodes, and FIG. 5C is an enlarged cross-sectional view of portion 'D' in FIG. 5B.

In FIGS. 5A to 5C, a lamp 200 of the present embodiment improves the energy efficiency and optical properties of the light in comparison with the lamp in FIGS. 4A to 4C.

The lamp 200 compensates for its optical properties by forming electrodes 222 and 224 (220) at the external sides of a lamp tube 210.

This is a distinction from a conventional lamp for LCD in which densities of electrons and ions are increased to cause non-uniformity in luminance because electrodes are formed inside a lamp tube of the lamp.

By forming the electrodes 220 at selected portions outside the lamp tube 210, these selected portions of the lamp tube 210 are shielded by the electrodes 220. As a result, the shielded portions function as a dielectric member.

Specifically, the shielded portions of the lamp tube 210 hinder electrons in the lamp tube 210 from moving toward the electrodes 220 as densities of electrons and ions increase within the lamp tube 210. The shield portions of the lamp tube 210 may be means for compensating optical characteristics of the light from the lamp tube 210, which is disposed between a discharging space and electrodes of the lamp tube 210 and generates flux of charges which decreases in response to an increase in densities of ions and electrons generated by discharging in the lamp tube 210.

More particularly, the electrodes 220, the lamp tube 210 and plasma within the lamp tube 210 function as a capacitor. Thus, in case that dielectric material is interposed between an electrode and discharge space in which plasma is formed, and thus capacitive reactance is formed, current flow is hindered by the capacitive reactance as densities of ions and electrons within the discharge space become higher than a predetermined density.

When the plural lamps having different current deviations from each other are driven by a single inverter, the current flow in one lamp having a good current flow is hindered while the current flow in other lamp having a relatively not good current flow is enhanced and such compensation process is repeatedly performed with respect to each lamp to correct the deviation in the luminance between the lamps.

Meanwhile, because the electrodes 220 are arranged at the outside of the lamp tube 210 for compensating for the deviation of the luminance, utilization efficiency of light may decrease. Description of preferred embodiments in which the probable-decrease of the light utilization efficiency is eliminated, follows.

Referring to FIG. 5A, electrodes 220 (e.g., two electrodes 222 and 224) receive a lamp tube 210 in which fluorescent material is coated on the inner surface of the lamp tube 210 and discharging gas is injected therein. Both ends of the lamp tube 210 are sealed. Portions of the two electrodes 222 and 224 are cut to form openings 222b and 224b. In this case, the openings 222b and 224b are formed at portions through which the light is emitted to a display device, thereby maximizing an effective display region.

Although the light efficiency is improved by partially cutting the electrodes 220 to form the openings 222b and 224b, power consumption of the electrodes 220 may be increased comparing to the electrodes 120 in FIG. 4A because the size of the electrodes 220 may be reduced.

To solve the above-mentioned problem, extended portions 222a and 224a are formed from the electrodes 220 at portions where the light is not supplied when the electrodes 220 are partially opened as shown in FIG. 5A. It is noted that the extended portions 222a and 224a do not disturb travel of the light from the lamp 210.

Hereinafter, a method for manufacturing a lamp according to one embodiment of the present invention will be described with reference to accompanying drawings.

Referring to FIGS. 5A to 5C, the fluorescent material 212 is coated on the inner surface of the lamp tube 210, and the discharging gas 214 is injected in the lamp tube 210. The fluorescent material 212 is coated to have a uniform thickness, and the discharging gas 214 is injected at a predetermined pressure. Then, the lamp tube 210 is sealed.

Next, the electrodes 220 are formed to be combined with the lamp tube 210. The electrodes 220 preferably have a cap shape whose one end is closed and the other end is opened. The electrodes 220 may have a cylindrical shape having openings 224a and 224b by partially cutting away the end portions.

The electrodes 220 are combined with the lamp tube 210. In particular, the end portions of the lamp tube 210 are inserted in the electrodes 220, respectively, so that surfaces of the end portions of the lamp tube 210 are faced with the insides of the electrodes 220, respectively.

Figure 6A:
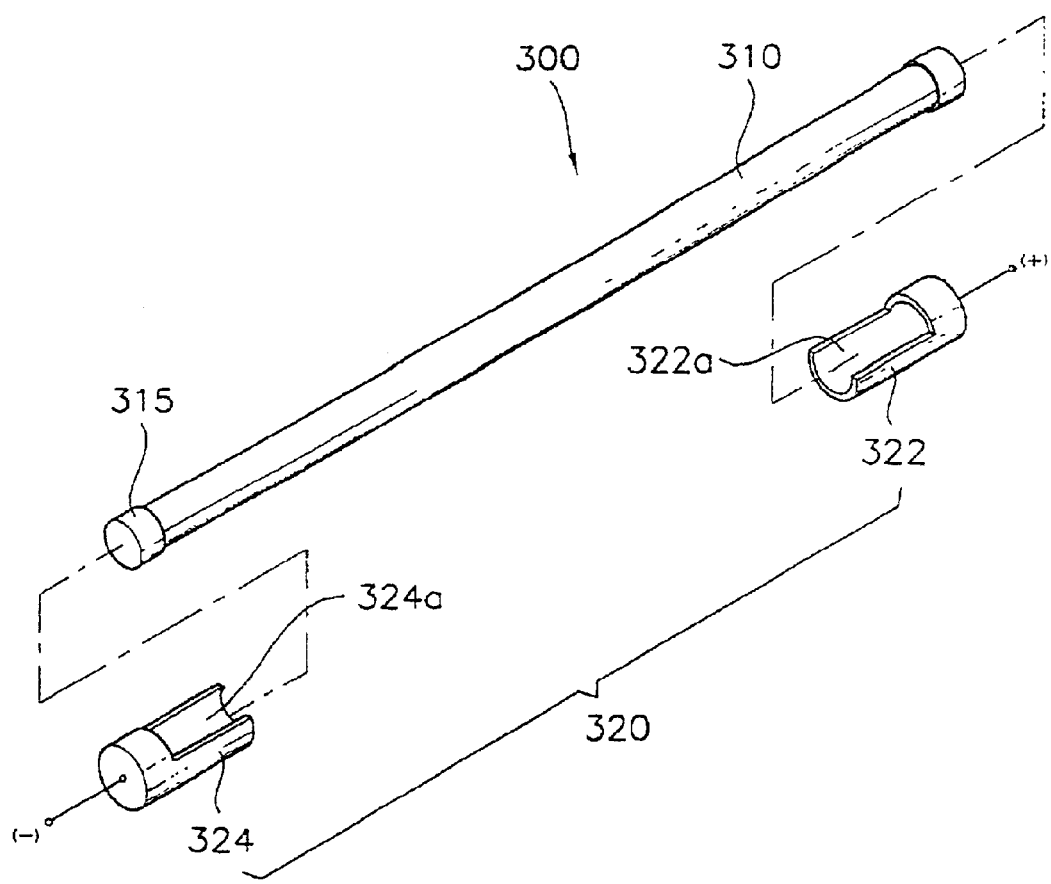
FIG. 6A is an exploded perspective view illustrating a lamp according to still another embodiment of the present invention.
Figure 6B:
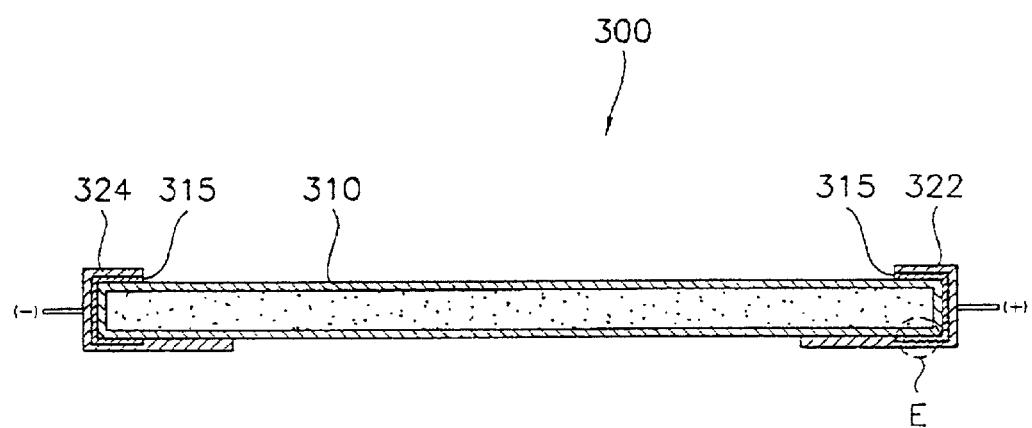
FIG. 6B is a cross-sectional view showing the lamp in FIG. 6A.
Figure 6C:
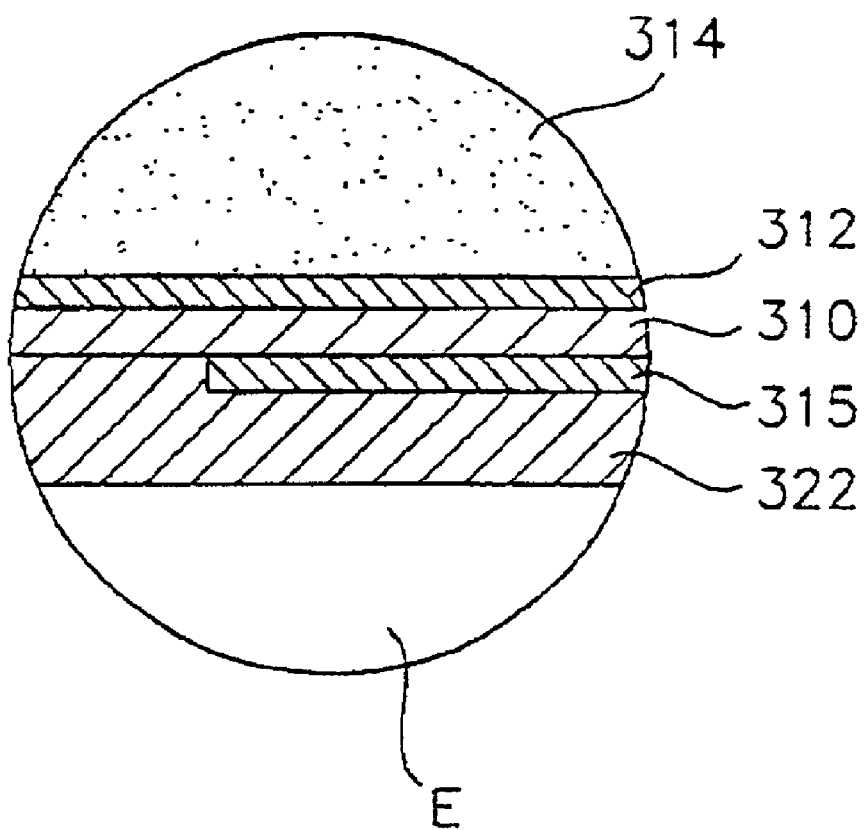
FIG. 6C is an enlarged cross-sectional view of portion 'E' in FIG. 6B.

FIG. 6A is an exploded perspective view illustrating a lamp according to still another embodiment of the present invention, FIG. 6B is a cross-sectional view showing the lamp having a lamp tube combined with electrodes, and FIG. 6C is an enlarged cross-sectional view of portion 'E' in FIG. 6B.

Referring to FIG. 6A, a lamp assembly 300 includes a lamp 310 and a set of conductive sockets 320 (e.g., two sockets 322 and 324).

In this case, the lamp 310 has a tube shape whose ends are closed, and electrodes 315 are respectively capped on end portions of the lamp 310. The electrodes 315 can be manufactured using various processes such as a plating process, a coating process and a vacuum evaporation process and the like. Particularly, the electrodes 315 may be made of Indium Tin Oxide (ITO) or Indium Zirconium Oxide (IZO) which may be deposited by a vacuum evaporation process.

As shown in FIG. 6C, the fluorescent material 312 is coated on the inner surface of the lamp 310, and the discharging gas 314 is injected into the lamp 310. After the fluorescent material 312 and the discharging gas 314 are coated and injected, respectively, the lamp 310 is sealed.

End portions of the lamp 310 are received into the conductive sockets 320 which have been separately manufactured. The conductive sockets 320 for receiving the lamp 310 preferably have a cylindrical shape which is partially cut to form openings 322a and 324a. The openings 322a and 324a are formed at the conductive sockets 320 to maximize the effective light emitting region where the light is emitted as described above.

Referring FIGS. 6B and 6C, the electrodes 315 and the conductive sockets 320 disposed at end portions of the lamp 310 make direct contact with each other so that they are electrically connected with each other.

FIG. 7 is a schematic cross-sectional view showing a liquid crystal display device including a lamp assembly according to a preferred embodiment of the present invention.

A plurality of lamps 200 each of which is the same as one of the above-described embodiments may be employed to improve the performance in a liquid crystal display device 900 as shown in FIG. 7. It should be noted that the types of the lamps 200 employed in the lamp assembly 290 are not limited to the types of the lamps shown in FIGS. 4A–6C.

Referring to FIG. 7, a liquid crystal display device 900 has a lamp assembly 290, a receiving container 400, a liquid crystal display panel assembly 500, a middle chassis (not shown), and a case 600 (e.g., a bottom 610 and a top 620). The lamp assembly 290 includes at least one lamp 200, a power supply device 270 (referring to FIG. 10), and a diffusion plate 280. The middle chassis combines the liquid crystal display panel assembly 500 with the receiving container 400.

Figure 8:
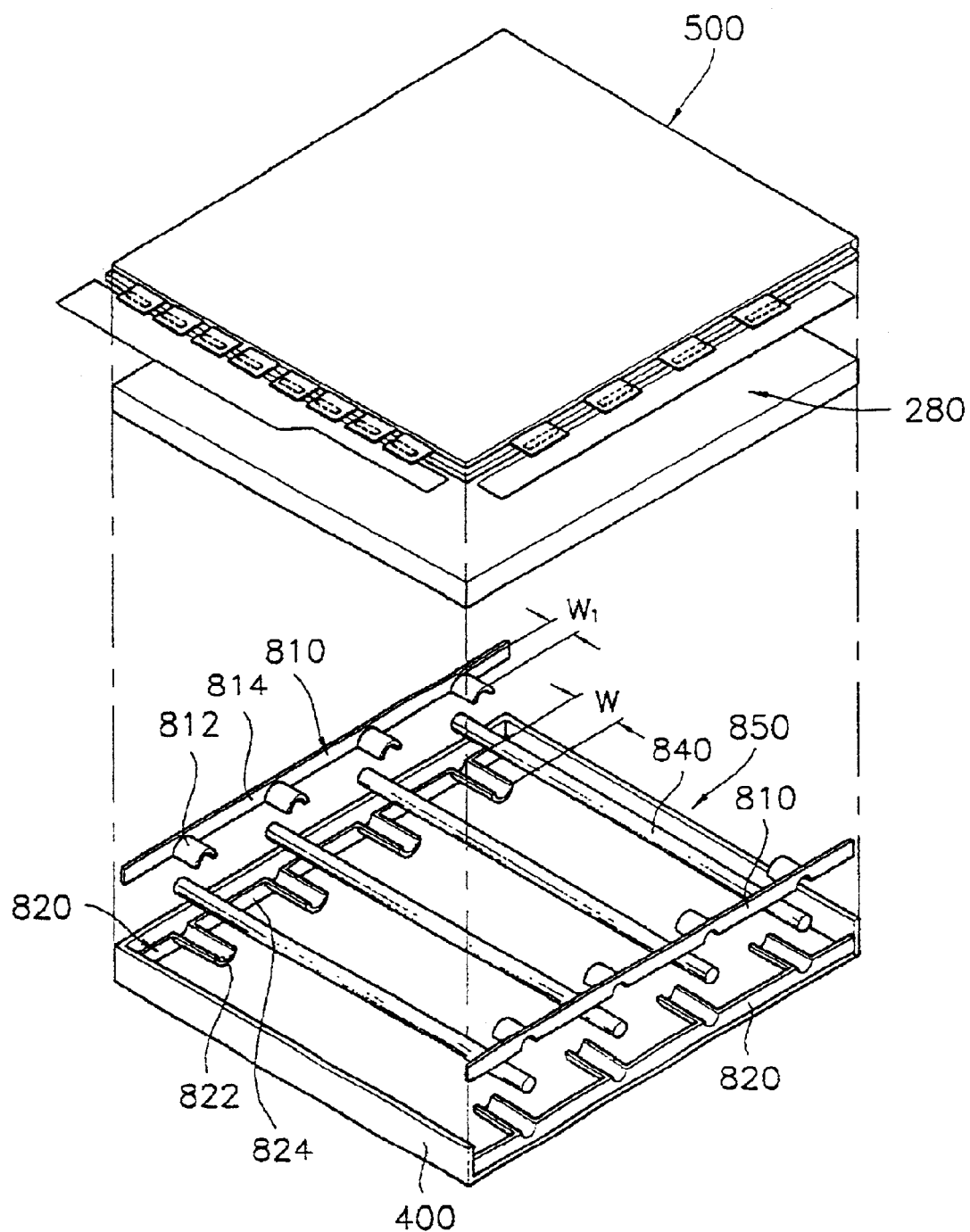
FIG. 8 is an exploded perspective view illustrating the liquid crystal display device according to the preferred embodiment of the present invention.
Figure 9A:
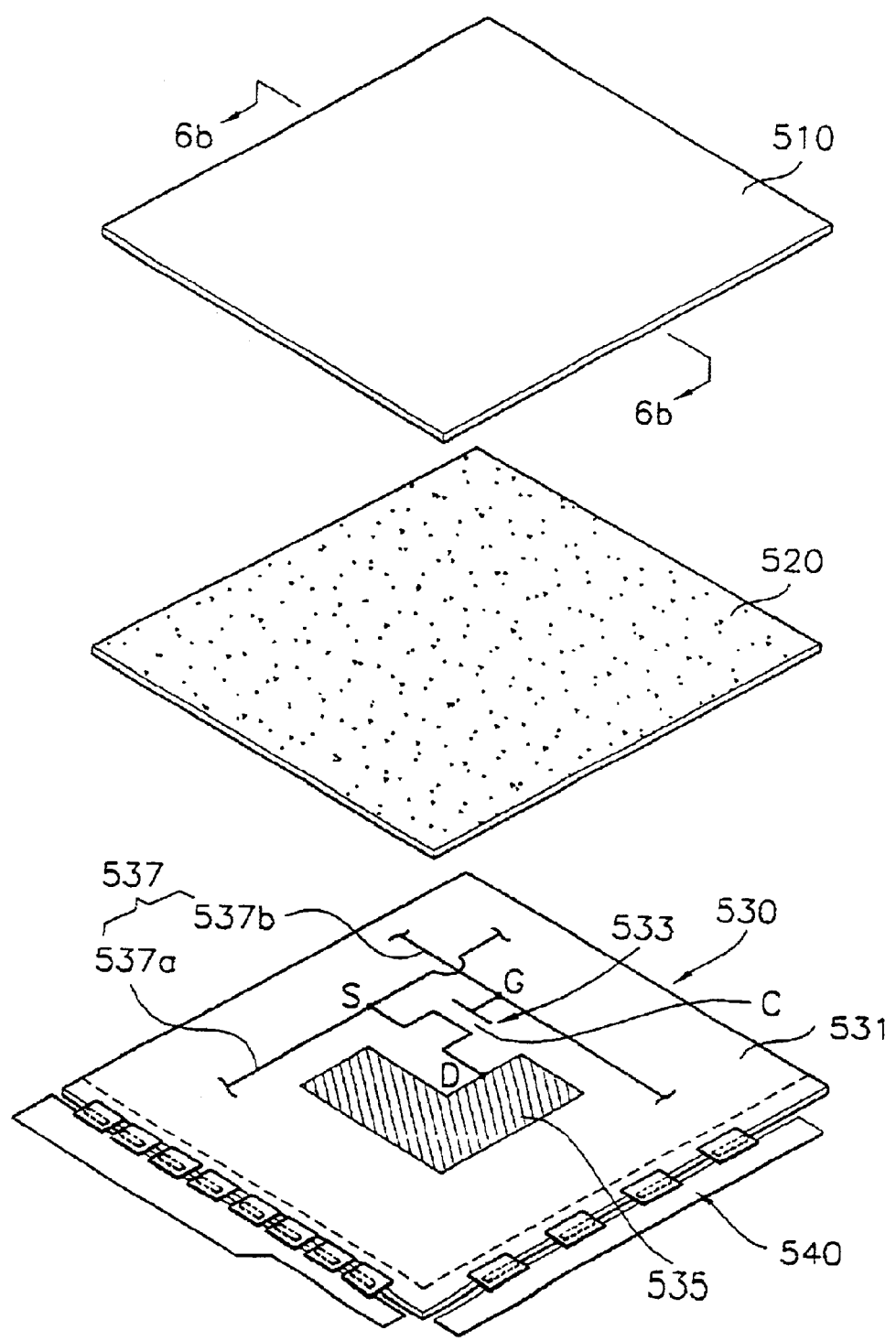
FIG. 9A is an exploded perspective view of the liquid crystal display panel assembly in FIG. 8.
Figure 9B:
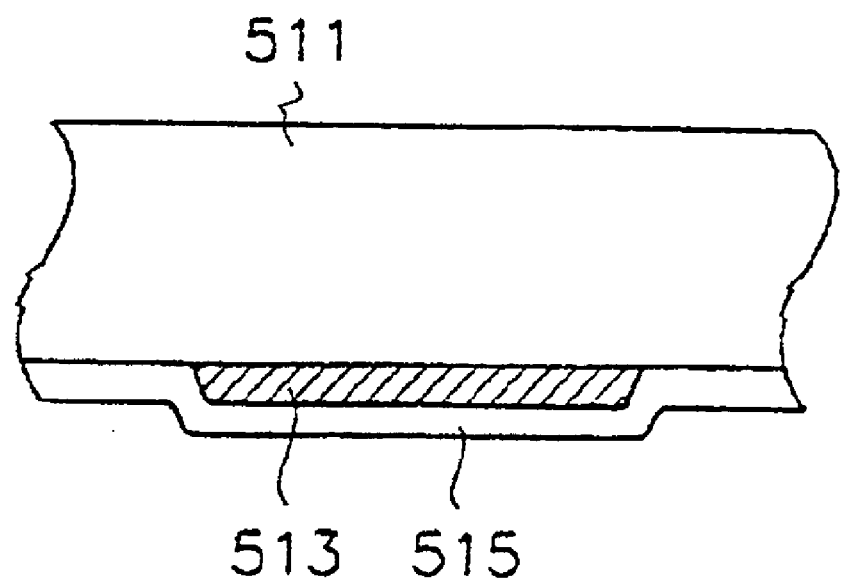
FIG. 9B is a cross-sectional view of the color filter substrate in FIG. 9A.

Referring to FIGS. 8, 9A and 9B, the liquid crystal display panel assembly 500 has a color filter substrate 510, a liquid crystal 520, a thin film transistor (TFT) substrate 530, and a driving module 540.

The color filter substrate 510 includes a transparent substrate 511, red•green•blue (R•G•B) color pixels 513, and a common electrode 515 as shown in FIG. 9B. In this case, the R•G•B color pixels 513 are formed at a portion of the transparent substrate 511. The R•G•B color pixels 513 are formed to have a matrix shape on the transparent substrate 511 using thin film deposition technique. The R•G•B color pixels 513 arranged in the matrix shape filter white light to generate red light, green light or blue light.

The common electrode 515 preferably made of ITO is formed on the whole surface of the transparent substrate 511 where the R•G•B color pixels 513 are positioned. The common electrode 515 can be made of any transparent material having electrical conductivity.

FIG. 9A is an exploded perspective view showing the TFT substrate 530 of the liquid crystal display panel assembly 500 in FIG. 8, FIG. 9B is a cross-sectional view showing the color filter substrate 510 in FIG. 9A, and FIG. 10 is a block diagram illustrating a plurality of lamps connected to an inverter according to preferred embodiment of the present invention.

Referring to FIGS. 9A and 9B, the TFT substrate 530 includes a transparent substrate 531, thin film transistors 533, pixel electrodes 535, and signal lines 537. A plurality of thin film transistors 533 are formed on a portion of the transparent substrate 531 by semiconductor technology. The number of the thin film transistors 533 is the same as that of the R•G•B color pixels 513.

Each thin film transistor 533 has a gate electrode G, a source electrode S, a drain electrode D, and a channel region C as shown in FIG. 9A.

In particular, the channel region C may be converted from conductive property to nonconductive property and vice versa. The channel region C is formed on an upper face of the transparent substrate 531.

The gate electrode G is formed over the channel region C to be insulated from the channel region C positioned on the transparent substrate 531. Also, the source electrode S is electrically connected to one portion of the channel region C, and the drain electrode G is electrically connected to the other portion of the channel region C.

With respect to the thin film transistors 533 disposed in a matrix shape, gate lines 537b are connected to gate electrodes G of the thin film transistors 533 disposed in a column direction, and data lines 537a are connected to source electrodes S of the thin film transistors 533 disposed in a row direction.

The driving module 540 is connected to the gate lines 537b and the data lines 537a to apply signals to the thin film transistors 533.

The pixel electrodes 535 are formed on all the drain electrodes D of the thin film transistors 533. The pixel electrodes 535 are preferably made of transparent material having electrical conductivity such as ITO. The pixel electrodes 535 face the R•G•B color pixels 513 of the color filter substrate 510.

The liquid crystal 520 is injected between the TFT substrate 530 and the color filter substrate 510 to form a liquid crystal layer. The light transmissivity of the liquid crystal 520 varies in response to electric field generated between the common electrode 515 and the pixel electrode 535.

For the liquid crystal display panel assembly 500 having the above-mentioned structure, any of the lamps, for example, described in FIGS. 4A to 6C may be employed. In this case, the lamps are connected to the power supply device 270 in parallel as shown in FIG. 10. The lamps receive electric power from the power supply device 270, and then emit light for displaying images.

Referring again to FIG. 8, a lamp tube receives electric power through a common electrode different from the electrodes in FIGS. 4A, 5A and 6A. As shown in FIG. 8, a plurality of lamp tubes 840 are disposed in a receiving container 400 in parallel. Discharging gas is injected into the lamp tubes 840, and fluorescent material is coated inside the lamp tubes 840.

The lamp tubes 840 receive electric power through common electrodes 810, 820. To improve connection convenience between the lamp tubes 840 and the common electrodes 810, 820, the common electrodes 810, 820 may be divided into two parts, upper common electrodes 810 and lower common electrodes 820.

The lower common electrodes 820 have lamp tube supporters 822 and a first connecting member 824 for connecting the lamp tube supporters 822 with each other. One end of each lamp tube supporter is connected to the first connecting member 824 at a regular interval between the adjacent lamp tube supporters. The number of the lamp tube supporters 822 is the same as that of the lamp tubes 840. Also, the lamp tube supporters 822 respectively support bottoms of the lamp tubes 840. The lamp tube supporters 822 preferably have a substantially identical length W.

The upper common electrodes 810 are electrically connected to the lower common electrodes 820 and have lamp tube covers 812 and second connecting member 814 for connecting the lamp tube covers 812. One end of each lamp tube cover is connected to the second connecting member 814 at a regular interval between the adjacent lamp tube covers. The number of the lamp tube covers 812 is the same as that of the lamp tubes 840. The lamp tube covers 812 preferably have a substantially identical length W1, which is shorter than the length W of the lamp tube supporters 822. Since the length of the lamp tube covers W1 is shorter than the length of the lamp tube supporters 822 W, the area blocking the light generated from the lamp tube 840 is reduced.

The lamp 850 is fixed on a bottom surface of the receiving container 400. However, the light generated from the lamp 850 may have non-uniform brightness distribution because light from each lamp tube may have different brightness. In other words, some lamps may generate light with high brightness while other lamps may generate light with low brightness.

To overcome the brightness non-uniformity of the light from the lamp 850, a diffusion plate 280 is disposed between the lamp 850 and the liquid crystal display panel assembly 500 for diffusing the light to have uniform light distribution according to the present invention.

Hereinafter, a method for fabricating a liquid crystal display device will be described with reference to FIG. 8.

The lamp tube supporters 822 are disposed on the bottom surface of the receiving container 400. The lower common electrodes 820 having the lamp tube supporters 822 are respectively disposed at edges of the receiving container 400 and opposite to each other at a distance substantially identical to the length of the lamp tubes 840. The end portions of the lamp tubes 840 are disposed on the lamp tube supporters 822, respectively. In this case, dielectric layers (not shown) having predetermined dielectric capacities are formed on the lamp tube supporters 822 before the lamp tubes 840 are mounted on the lamp tube supporters 822.

The lamp tube covers 812 are respectively mounted on the lamp tubes 840 disposed on the lamp tube supporters 822. Also, dielectric layers (not shown) having predetermined dielectric capacities are formed on the bottom surfaces of the lamp tube covers 812 to make contact with the end portions of the lamp tubes 840.

The middle chassis (not shown) is disposed on the receiving container 400 including the lamp tube supporters 822, the lamp tubes 840, and the lamp tube covers 812 therein. The middle chassis combines the diffusion plate 280 and the liquid crystal display panel assembly 500 with the receiving container 400. At that time, the diffusion plate 280 is fixed at a predetermined portion of the middle chassis when the middle chassis is combined with the receiving container 400 as shown in FIG. 8. The liquid crystal display panel assembly 500 is fixed on the diffusion plate 280, thereby completing the liquid crystal display device.

In the above-described embodiments of the present invention, each common electrode is divided into lower and upper common electrodes, and the lower and upper common electrodes are combined with the lamp tubes. However, the common electrodes can be combined with the lamp tubes in a different manner such that one common electrode is divided into the lower and upper common electrodes as described above while the other common electrode is not divided.

According to the present invention, the power consumption of a liquid crystal display device is reduced and its light efficiency is increased in case of employing one lamp tube to generate the light for displaying images. In case of employing multiple lamp tubes to generate the light for displaying images, the liquid crystal display device may have, in addition to the low power consumption and high light efficiency, minimized brightness differences between the lamp tubes.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A lamp for generating light comprising:
   a lamp tube having fluorescent material coated on an inner surface of the lamp tube and discharging gas injected into the lamp tube, for generating light by receiving electric power externally provided; and
   electrodes for respectively receiving end portions of the lamp tube and applying the electric power to the lamp tube,
   wherein the end portions that are opposite to each other are inserted into the electrodes so that the electrodes surround an entirety of the circumferential surface of the end portions, and an opening is formed at a selected portion of each electrode to reduce area locking the light generated from the lamp tube.

2. The lamp of claim 1, further comprising an adhesion layer formed between the lamp tube and the electrode, wherein the adhesion layer includes dielectric material.

3. The lamp of claim 1, wherein each of the electrodes has the opening at a first region of an electrode body receiving a corresponding end portion of the lamp tube, and an extension portion at a second region opposite to the first region, the extension portion being extended inwardly with respect to the lamp tube from an edge of the electrode.

4. The lamp of claim 3, wherein only one opening is formed at the first region, and only one extension portion is formed at the second region.

5. The lamp of claim 1, wherein the electric power is a discharging voltage.

6. A lamp assembly comprising:
   a lamp comprising:
      a lamp tube including discharging gas injected into the lamp tube and fluorescent material coated on an inner surface of the lamp tube, for generating light by receiving electric power; and
      electrodes formed on end portions of the lamp tube; and
   conductive sockets for respectively receiving the electrodes of the lamp, the electric power being externally applied to the respective conductive sockets,
   wherein the electrodes that are opposite to each other are inserted into the conductive sockets so that the conductive sockets surround an entirety of the circumferential surface of the electrodes, and an opening is formed at a selected portion of each conductive socket to reduce area blocking the light generated from the lamp tube.

7. The lamp assembly of claim 6, wherein each of the conductive sockets is longer than corresponding one of the electrodes so that the conductive sockets cover the electrodes, respectively.

8. The lamp assembly of claim 6, wherein each of the conductive sockets has the opening at a first region of a conductive socket body receiving a corresponding end portion of the lamp, and an extension portion at a second region opposite to the first region, the extension portion being extended inwardly with respect to the lamp from an edge of the conductive socket.

9. The lamp assembly of claim 8, wherein only one opening is formed at the first region, and only one extension portion is formed at the second region.

10. The lamp assembly of claim 6, wherein the electrodes each have indium tin oxide.

11. The lamp assembly of claim 6, wherein the electric power is a discharging voltage.

12. A lamp assembly for generating light comprising:
    a lamp tube having fluorescent material coated on an inner surface of the lamp tube and discharging gas injected into the lamp tube, for generating light by receiving a discharging voltage externally provided; and
    a plurality of electrodes having a first portion that surrounds an entirety of the circumferential surface of an end portion of the lamp tube and a second portion connected to the first portion, for respectively receiving end portions of the lamp tube and applying the discharging voltage to the lamp tube, the second portion having an opening to reduce area blocking the light generated from the lamp tube.

13. The lamp of claim 12, further comprising an extension portion extended inwardly with respect to the lamp tube from an edge of the second portion.

14. A lamp assembly of comprising:
    a lamp comprising:
       a lamp tube including discharging gas injected into the lamp tube and fluorescent material coated on an inner surface of the lamp tube, for generating light by receiving a discharging voltage; and
       electrodes formed on end portions of the lamp tube; and
    a plurality of conductive sockets having a first portion that surrounds an entirety of the circumferential surface of an end portion of the lamp tube and a second portion connected to the first portion, for respectively receiving the electrodes of the lamp, the discharging voltage being externally applied to the respective conductive sockets, the second portion having an opening to reduce area blocking the light generated from the lamp tube.

15. The lamp assembly of claim 14, wherein the electrodes each have indium tin oxide.

* * * * *